(12) United States Patent
Liu et al.

(10) Patent No.: US 10,257,300 B2
(45) Date of Patent: Apr. 9, 2019

(54) PRECISION PUSH METHOD FOR INTERNET INFORMATION

(71) Applicants: Sha Liu, Chongqing (CN); Dongqin Yao, Chongqing (CN)

(72) Inventors: Sha Liu, Chongqing (CN); Dongqin Yao, Chongqing (CN)

(73) Assignee: Chongqing Sizai Information Technology Co., Ltd., Chongqing (CN)

( * ) Notice: Subject to any disclaimer, the term of this patent is extended or adjusted under 35 U.S.C. 154(b) by 81 days.

(21) Appl. No.: 15/339,936

(22) Filed: Nov. 1, 2016

(65) Prior Publication Data

US 2017/0048345 A1 Feb. 16, 2017

Related U.S. Application Data

(63) Continuation of application No. PCT/CN2015/077680, filed on Apr. 28, 2015.

(30) Foreign Application Priority Data

May 1, 2014 (CN) .......................... 2014 1 0180221

(51) Int. Cl.
| | |
|---|---|
| *G06F 15/16* | (2006.01) |
| *H04L 29/08* | (2006.01) |
| *G06F 17/30* | (2006.01) |
| *G06F 3/0482* | (2013.01) |

(52) U.S. Cl.
CPC .......... *H04L 67/26* (2013.01); *G06F 17/3089* (2013.01); *G06F 17/30864* (2013.01); *G06F 17/30899* (2013.01); *H04L 29/08* (2013.01); *H04L 67/02* (2013.01); *G06F 3/0482* (2013.01)

(58) Field of Classification Search
USPC ................................. 709/201, 217, 218, 219
See application file for complete search history.

(56) References Cited

U.S. PATENT DOCUMENTS

| | | | |
|---|---|---|---|
| 8,954,555 B2 * | 2/2015 | Burckart | H04L 67/26 709/223 |
| 2015/0019662 A1 * | 1/2015 | O'Kane | G06Q 10/107 709/206 |
| 2017/0048345 A1 * | 2/2017 | Liu | H04L 29/08 |

* cited by examiner

*Primary Examiner* — Liang Che A Wang
(74) *Attorney, Agent, or Firm* — Wayne & Ken, LLC; Tony Hom

(57) ABSTRACT

The present invention could achieve the implementation of one-off publishing by users of structured information, non-structured information, text information and webpage information, precisely push these information to various internet information application platforms and relevant information requiring users, thus relieving an internet user from the distress of repeatedly publishing on various application platforms, reducing information collecting costs of the internet application platforms, and further improving communication and application efficiency of internet information.

4 Claims, 8 Drawing Sheets

| Ten Frequently-used Classifications of Abstract Information | Inputting any topic keyword and entering any website— (Such as NBA, National Development and Reform Commission, Microsoft China, Smartphone, Cloud Computing, Han Han, Blockbuster of Europe and America...) | | | | | | | | |
|---|---|---|---|---|---|---|---|---|---|
| | News | Notice | Knowledge | Product | Service | Interpersonal Communication | On Demand/ Download | Blog/ Microblog | Big Yellow Page | User-Added Classification (Forum) | Free Classification |
| Frequently-used Top-layer Structure Tag | Title | Title | Title | Title | Title | Title | Title | Title | Title | ( ) | |
| | Behavior Body | Notice Body | Question | Product Name | Service Title | Communication Purpose | Content Name | ... | Name | ( ) | |
| | Behavior | Notice Point | Conception Definition | Product Description | Service Content | Sex | Brief Introduction of Content | ... | Category | ( ) | Non-structured Abstract |
| | | Notice Region | Rationale | Manufacturer | Service Mode | Age | Leading Role | ... | Organization Setting | ( ) | |
| | Time | Notice Object | Application Method | Product Price | Service Time | Profession | Provider | ... | Contact Way | ( ) | |
| | Place | ... | ... | ... | ... | ... | ... | ... | ... | ( ) | |
| Others | ( ) | ( ) | ( ) | ( ) | ( ) | ( ) | ( ) | ( ) | ( ) | ( ) | |

Fig. 1

Abstract Publishing Example

- News
- Notice
- Knowledge
- Product
- Service
- On Demand
- Download
- Communication
- Forum
- Blog
- Internet Address
- Yellow Page
- Publish Non-structured Abstract Freely

Job Wanted ○  Work ⊙  Leisure ○  Activity ○  Marriage-seeking ○  Dating ○  Others ○

| | |
|---|---|
| Publisher | Beijing Hongtu Technology Co., Ltd |
| Purpose of Communication | Recruiting |
| Sex | Male |
| Age | Under 30 years old |
| Profession | Marketing Manager |
| Expertise | Computer Hardware |
| Others | Offer abundant salary and accommodation |
| Linkable Web | http://www.hongtu.cn/hr070301.php |

Directly Publishing  Detailed Information Attached

Cancel Example

Abstract Publishing   Upload Detailed Information   Independent Classification of Site Information Establish Cloud Storage Website   Information Push

Fig. 2

Input Box of Topic Keyword  [Smartphone]

Click the words in the following picture ——— Invoke relevant information directly (Alternative)
Double click the words in the following picture ——— Input retrieval key words in the specified range (Alternative)
Clicking the classification words is equal to selecting all of the classification

| Classi-fication | News | Notice | Knowledge | Product | Service | Communi-cation | Download/On Demand | ... | Others | More Pragmatic Keyword Options |
|---|---|---|---|---|---|---|---|---|---|---|
| | Title | Title | Title | Title | Title | Title | Title | ... | | Free Abstract |
| | Behavior Body | Notice Body | Question | Product Name | Service Content | Communica-tion Purpose | Brief Introduction of Content | ... | | |
| | Behavior | Notice Content | Conception Definition | Product Description | Service Mode | Sex | Leading Role | ... | | |
| | Time | Notice Region | Rationale | Manufacturer | Service Mode | Age | Protagonist | ... | | Sublayer Classification Setting |
| | ... | ... | ... | ... | ... | ... | ... | ... | | |
| | Others (Free Abstract) | Others (Free Abstract) | Others (Free Abstract) | Others (Free Abstract) | Others (Free Abstract) | Others (Free Abstract) | Others (Free Abstract) | | | |

Data Type:   Web☐    File☐    Picture☐    Video☐    ...

[Abstract Search]  [Full Text Search]  [Structured Search]  [Mobile Location Search]

Fig. 3

Topic Keyword Inputting: Beijing   Housing Provident Found Loans
Selection Results of Pragamatic Keyword: Service Classicification (equal to selecting all pragmatic keyword of service classification)

Retrieval Results for Structured Abstract:
(Service Title) Housing Provident Found Loan Services of Beijing
(Publishing Party) Beijing Baofucheng Real Estate Consulting Co., Ltd
(Service Organization) Agent for Beijing Housing Provident Found Management Center
(Service Place) Room 366, Huatong Building, No. 19A,Chegongzhuang West Road, Haidian District   "Map Information"
(Service Time) 9:00am-5:00pm
(Service Telephone) 010-6000666
(Free Abstract) It normally takes no more than two weeks to get the loan since the documents were prepared and the highest loan limit is 800 thousand yuan. Provident fund loan "Knowledge" search Detailed Information   Linkable webpage.   Information Push

Retrieval Results for Semi-structured Information (Webpage Information)
(Title) Housing Provident Fund Loan Services of Beijing
(Abstract) The interest-rate cut of housing provident fund loan of Beijing is going to be executed from Sep 16th, loan rate of less than 5 years is to lower by 0.18%, loan rate of more than 5 years is to lower by 0.09%.

Detailed Information  ......  Information Push

Relevant Retrieval Results:

News: Beijing adjusts the housing provident fund loans   Abstract   Detailed Information   More News
Notice: Notice of adjusting the housing provident fund loan interest-rate   Abstract   Detailed Information   More Notice
Service: Network of provident fund management department in each county   Abstract   Detailed Information   More Service
Knowledge: Fee standard of guarantee service fee of personal housing provident fund loans   Abstract   Detailed Information
Download: Reference form of equal monthly payments of housing provident fund loans of Beijing Abstract   Detailed Information   More Download

Fig. 4

Abstract Publishing Example

- News
- Notice
- Knowledge
- Product
- Service
- On Demand
- Download

Communication

- Forum
- Blog
- Internet Address
- Yellow Page

Non-structured Abstract

Job Wanted ○   Work ●   Leisure ○   Activity ○   Marriage-seeking ○   Dating ○   Others ○

| | |
|---|---|
| Publisher | Beijing Hongtu Technology Co., Ltd |
| Purpose of Communication | Recruiting |
| Sex | Male |
| Age | Under 30 years old |
| Profession | Marketing Manager |
| Expertise | Computer Hardware |
| Others | Offer abundant salary and accommodation |
| Linkable Web | http://www.hongtu.cn/hr070301.php |

Cancel Example

Directly Publishing | Detailed Information Attached

Pushing Object Option: Relevant Professional Website ☐   Relevant Publishing Platform ☐   Relevant Organization Website ☐

Relevant Requiring User ☐   Mobile Location Information Service ☐   Manual Calling Information Pushing ☐

Input Box of Specified User Name, Pushing Address

Abstract Pushing   All Pushing   Structured Information Pushing

Fig. 6

Step 701: Judging whether the information receiving requirement form is provided by the push information receiver.

Step 702: If the information receiving requirement form is provided by the push information receiver, using information to be pushed to match the contents of the information receiving requirement form. If the matching degree meets the demand of the push information receiver, pushing the information to the push information receiver.

Step 703: If the information receiving requirement form is not provided by the push information receiver, pushing the information to the address of push information receiver appointed by the information push user.

Fig. 7

Information Pushing Requirement Form

| News |
| Notice |
| Knowledge |
| Product |
| Service |
| On Demand |
| Download |
| Communication |
| Forum |
| Blog |
| Publish Non-structured Abstract Freely |
| Others |

Job Wanted ○  Work ⦿  Leisure ○  Activity ○  Marriage-seeking ○  Dating ○  Others ○

Publisher: Beijing Hongtu Technology Co., Ltd
Purpose of Communication: Recruiting
Sex: Male
Age: Under 30 years old
Profession: Marketing Manager Abstract Information    Detailed Information

Fig. 8

PRECISION PUSH METHOD FOR INTERNET INFORMATION

CROSS-REFERENCE TO RELATED APPLICATIONS

This application is a continuation of International Patent Application No. PCT/CN2015/077680 with a filing date of Apr. 28, 2015, designating the United States, now pending, and further claims priority to Chinese Patent Application No. 201410180221.1 with a filing date of May 1, 2014. The content of the aforementioned applications, including any intervening amendments thereto, are incorporated herein by reference.

TECHNICAL FIELD

The present invention relates to the computer and communication field, in particular to a precision push method for internet information.

BACKGROUND OF THE PRESENT INVENTION

Information push has already become an extremely common method for information service in internet information communication. The main characteristic of information push is that there is no need for the receiving users to send a request, the push technology can transmit data promptly to clients, such as sending e-mails, pushing customized information and short messages.

With the coming of Self-media era (focusing on the user to release and spread internet information), a new application requirement for information push has been made: if the information published by the user could be pushed automatically and precisely to various internet information application platforms (such as E-commerce platform, recruiting platform, dating platform and industry application platform) and other requiring users, thus not only relieving various internet users from the distress of repeatedly publishing on various application platforms, but also significantly reducing information collection cost for various internet application platforms and repeated retrieval cost for relevant information requiring users. Also, it will be universally welcomed by information publishing users and requiring users.

However, compared with the traditional customized and non-customized information push, the new information push requirement not only needs preciser information push ability and better information push quality, but also needs to meet the well-timed push requirement of both structured information and non-structured information.

The present invention provides a precision push method for internet information to achieve the implementation of one-off publishing by users of various structured information and non-structured information, precisely and timely push these structured information and non-structured information to various relevant requiring application platforms and users.

SUMMARY OF PRESENT INVENTION

The present invention provides a precision push method for internet information to achieve the implementation of one-off publishing by users of various structured information and non-structured information, precisely and timely push these structured information and non-structured information to various relevant requiring application platforms and users. The main steps are as follows:

acquiring an "information push" instruction from an information push man-machine interaction interface and judging whether the information to be pushed is displayed in the information push man-machine interaction template;

if "yes", acquiring an information push requiring selection result of the information push man-machine interaction template; performing an "information push" instruction and saving relevant information to a push information database:

if "no", outputting a man-machine interaction template for retrieval, acquiring an information retrieval condition and retrieval instruction from the man-machine interaction template for retrieval; performing retrieval to all kinds of internet information and information and link information stored in a universal internet information publishing system and displaying a retrieval result added with an "information push" selecting button;

after certain information on a retrieval result displaying page, acquiring the "information push" instruction, and outputting the "information push" man-machine interaction template displaying the information;

acquiring an information push requiring selection result from the information push man-machine interaction template, performing the "information push" instruction, and saving relevant information to the push information database.

The following steps are performed before performing the "information push" instruction above steps:

judging whether a push information receiver has inputted information in an information receiving requirement form in consistent with a structure item of information publishing structured template;

if the push information receiver has inputted information in the information receiving requirement form, using information to be pushed to match the contents of the information receiving requirement form;

if a matching degree meets a demand of the push information receiver, pushing the information to the push information receiver;

if the information receiving requirement content is not provided by the push information receiver, pushing the information to the address of push information receiver appointed by an information push user;

the information push man-machine interaction template of the present invention includes but not limited to a push information display column, a push object selection item, an information push type selection item and an information push instruction button. Wherein the push object selection item includes relevant professional website, relevant publishing platforms relevant organization website, information service for mobile location and manual calling, and under each of the push object selection item, specific receiving user name or LOGO for users to select is displayed. Wherein the type selection item of push content includes abstract push, detailed information push and all push.

The push information of the present invention includes structured abstract information, non-structured abstract information, relevant detailed information of the information publishing and storage system described in the present invention, and linkable webpage information offered in the abstract information.

The push information receiver of the present invention includes any receiver capable of storing or displaying push information, which could be various internet communication terminals, web server and various internet information storage server.

DESCRIPTION OF THE DRAWINGS

FIG. 1 is a schematic diagram of top-layer structured tab of arbitrary key word;

FIG. 2 is a schematic diagram of universal template of the internet information publishing;

FIG. 3 is a schematic diagram of universal information retrieval man-machine interaction interface;

FIG. 4 is a schematic diagram of universal retrieval result of internet information retrieval;

FIG. 6 is a main page of information push man-machine interaction;

FIG. 7 is a flow chart of information push ice;

FIG. 8 is a schematic diagram of information receiving requirement form.

DETAILED DESCRIPTION OF PREFERRED EMBODIMENTS

Figure 5:
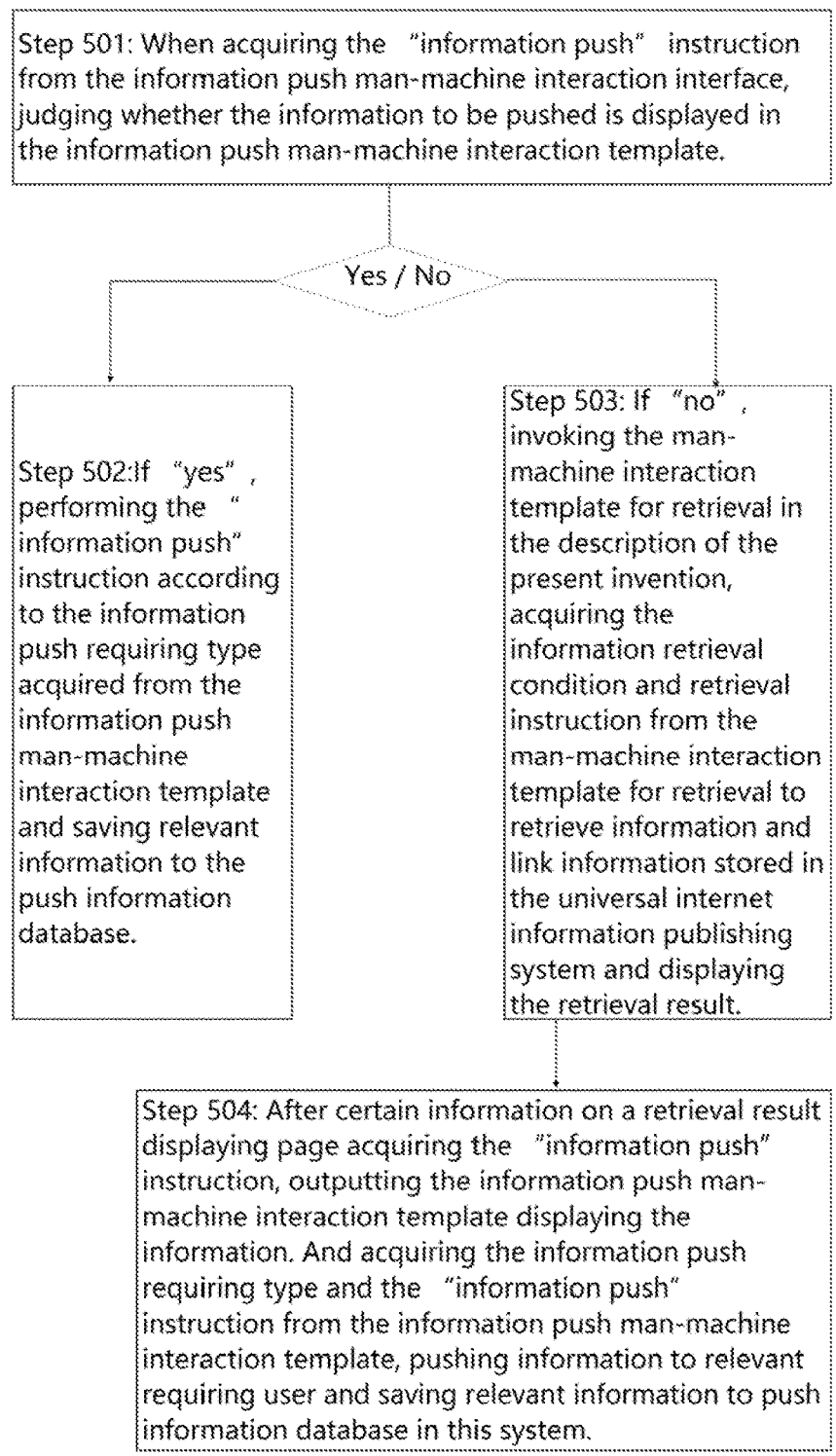
FIG. 5 is a main flow chart of information push service.

Refer to drawings 1-4.

For easy understanding of rationality and practicability of the present invention, it's necessary to illustrate the basic principle of the present invention; through the systematic analysis on retrieval result of the internet information full text keyword, the following "Double-ten Principle" is found—inputting arbitrary topic keyword, the commonly used top-layer common pragmatic keywords (equal to the structure tab of abstract information) of the application function and utility range of the locked target information is within the scope of 10×10 (See FIG. 1).

For the above "Double-ten Principle", the universal internet information publishing system in the present invention and embodiments of the present has the following characteristics:

See FIG. 2, FIG. 8.

The universal internet information publishing system of the present invention has the following characteristics:

carrying on statistical analysis of the common top layer, sublayer abstract structure tab and classification integration result of the arbitrary topic keyword of the internet information;

acquiring a result and automatically generating a structure tab of universal abstract database of the internet information including a link address of detailed information and a universal template of information publishing;

acquiring top layer and sublayer abstract structure tab applicable for the arbitrary topic keyword of the internet information added by users from the universal template of information publishing;

adjusting the universal abstract database of the internet information and the universal template structure tab of information publishing automatically according to the use frequency of system users, and saving the structure tab added by users in the abstract structure tab used by the users independently;

acquiring the instruction of invoking information publishing template of the users and outputting the universal template of internet information publishing pre-set with the common top layer and sublayer abstract structure tab of the arbitrary topic keyword;

acquiring the structured information abstract input by users and non-structured information abstract attached to "other" categories, items from the universal template of internet information publishing, and acquiring the structured abstract publishing information and non-structured abstract publishing information establishing mapping relationship with structured information tab in other websites and abstract structure tab of the system;

acquiring the detailed information uploaded by users after the abstract information published from the universal template of internet information publishing or add automatically or manually the abstract structure tab of the system to the thesaurus uploaded with detailed information or full text key words search of the web information of the outside system; and acquiring the instruction of information storing and saving the acquired abstract information in the storing database of universal abstract information, saving the acquired detailed information in the storing database of detailed information classification of the system.

Wherein the mapping relationship of structure tab includes both a top-level structure tab and a lower-level structure tab, both one-to-one relationship and one-to-more relationship; the structured tab is shown in table format, or in the form of structure tab words with colon.

The man-machine interaction template for retrieval and application methods of the present invention have the following characteristics:

See FIG. 3, FIG. 4

The man-machine interaction template for retrieval in consistent with structure tab or semantically consistent with the publishing information template is outputted.

The information retrieval condition inputted or selected by users from the retrieval man-machine interaction template is acquired.

A retrieval instruction is acquired, acquired information retrieval condition inputted or selected by users is used to match various internet information, including the structured information, non-structured information, relevant detailed information stored in the universal internet information publishing system and linkable detailed information beyond the system.

A retrieval result is outputted.

The man-machine interaction template for retrieval is provided with an input box of topic keyword of retrieval content, a selection item of pragmatic keyword of retrieval range limits, an input box of common keyword under the pragmatic keyword.

The information retrieval condition includes acquired topic keyword from the man-machine interaction template for retrieval, the pragmatic keyword selected by users, common keyword or combined result under selection item of pragmatic keyword, and relevant information of the universal internet information publishing system of the present invention, and various internet information.

Wherein the selection item of pragmatic keyword in the information retrieval condition and the input box of common keyword under the pragmatic keyword have multiple selection, but it is not allowed to select the pragmatic keyword only.

Embodiments: a precision push method for internet information to achieve the implementation of one-off publishing by users of various structured information and non-structured information, precisely and timely push these structured information and non-structured information to various relevant requiring application platforms and users.

The main steps of the present embodiment are as follows:

See FIG. 5, FIG. 4 and FIG. 6

Step 501: When acquiring the "information push" instruction from the information push man-machine interaction interface, judging whether the information to be pushed is displayed in the information push man-machine interaction template (See FIG. 6);

Wherein information to be pushed displaying on the information push man-machine interaction template includes structured information, text information and web information, and the text information and web information could be displayed in the form of file name or link address.

Step 502: if "yes", performing the "information push" instruction according to the information push requiring type acquired from the information push man-machine interaction template and saving relevant information to the push information database.

Step 503: if "no", invoking the man-machine interaction template for retrieval (See FIG. 3) in the description of the present invention, acquiring the information retrieval condition and retrieval instruction from the man-machine interaction template for retrieval to retrieve information and link information stored in the universal internet information publishing system and displaying the retrieval result.

Step 504: after certain information on a retrieval result displaying page acquiring the "information push" instruction, outputting the information push man-machine interaction template displaying the information. And acquiring the information push requiring type and the "information push" instruction from the information push man-machine interaction template, pushing information to relevant requiring user and saving relevant information to push information database in this system.

The following steps are performed before performing the "information push" instruction of above step 502 and 504:

See FIG. 7, FIG. 2, FIG. 8

Step 701: judging whether the information receiving requirement form is provided by the push information receiver.

Step 702: if the information receiving requirement form is provided by the push information receiver, using information to be pushed to match the contents of the information receiving requirement form. If the matching degree meets the demand of the push information receiver, pushing the information to the push information receiver;

Step 703: if the information receiving requirement form is not provided by the push information receiver, pushing the information to the address of push information receiver appointed by the information push user;

Wherein the content structure of the information receiving requirement form is the same as or similar to the structure of FIG. 2 of the present invention.

The practical values of the present invention are as follows: firstly, based on the relevant information publishing system and information retrieval methods connected and applied by the present invention, the present invention could precisely push various internet information with one-stop, including structured information, non-structured information or web information, and the present invention is a simple and universal customized push method.

Secondly, the present invention could achieve one-off publishing information by the user and precisely push the information needed by the receiver to various application platforms (such as E-commerce platform, recruiting platform, dating platform, mobile location information service provider, manual calling information service provider) and relevant requiring terminal users.

Thirdly, the present invention could not only significantly relieve the internet users from the distress of repeatedly publishing on various application platforms, but also meet the relevant special application requirements of information publishing users on various application platforms, such as direct dialogue and communication requirements, various trading requirements and other special application requirements.

In conclusion, through connection and combined application with the universal system of internet information publishing and man-machine interaction retrieval template and application method, the present invention has preciser information push ability and broader and more real requiring market of information push users, and will become a new tool of the huge market of information push requirement to broaden the internet information of Self-media era.

It should be understood by those skilled in the art that the embodiment of the present invention can be provided for method, system or computer program product. Therefore, the embodiment of the present invention can be in the form of complete hardware, complete software or the combination of hardware and software. Besides, the present invention can be in the form of implementing computer program product on one or more computer available storage medium (including but not limited to disk memory and optical memory) including computer available program code.

The present invention is described with reference to the method and apparatus (system) of embodiment of the present invention, and flowchart and/or block diagram of computer program product. It should be understood that each flow and/or block of flowchart and/or block diagram and combination of flow and/or block of flowchart and/or block diagram can be realized by computer program commands.

These program commands can be provided to the processor of general-purpose computer, special-purpose computer, embedded processor or other programmable data processing equipments to generate a machine, so that a device for realizing specified function in one or more flows of flowchart and/or one or more blocks of block diagram is generated by commands executed by the processor of computer or other programmable data processing equipments.

These computer program commands can also be stored in computer readable memory capable of guiding computer or other programmable data processing equipments to work in a particular way, so that the commands stored in computer readable memory generate manufactures including command device, and the command device realized specified function in one or more flows of flowchart and/or one or more blocks of block diagram.

These computer program commands can also be loaded into computer or other programmable data processing equipments, so that a series of operation steps are performed on the computer or other programmable data processing equipments to realize computer processing, thus a step for realizing specified function in one or more flows of flowchart and/or one or more blocks of block diagram is provided by commands executed by computer or other programmable data processing equipments.

Obviously, any modifications and variations can be made within the spirit and scope of the present invention for those skilled in the art. In this way, the present invention includes these modifications and variations if they belong to the scope of claims and equivalent technology of the present invention.

We claim:

1. A method for precisely pushing internet information, comprising the following steps:

acquiring an "information push" instruction from an information push interface and determining whether to-be-pushed information is displayed in an information push template;

when the to-be-pushed information is displayed in the information push template, acquiring a requirement for information pushing in the information push template; performing an "information push" instruction, and saving information relevant to an operation of the "information push" instruction to a database for information pushing; and when the to-be-pushed information is not displayed in the information push template, outputting a retrieval template, acquiring an information retrieval condition and retrieval instruction from the retrieval template; performing retrieval on all kinds of internet information together with link information and other information, wherein the link information and other information are stored in a universal internet information publishing system, and displaying a retrieval result added with an "information push" selecting button;

after acquiring the "information push" instruction for a first piece of information displayed in the retrieval result, taking the first piece of information as the to-be-pushed information and outputting the information push template on which the to-be-pushed information is displayed;

acquiring the requirement for information pushing from the information push template, performing the "information push" instruction, and saving the information relevant to the operation of the "information push" instruction to the database for information pushing;

wherein the following steps are performed before performing the "information push" instruction in the above steps:

determining whether a receiver has inputted a second piece of information in an information receiving requirement form;

when the receiver has inputted the second piece of information in the information receiving requirement form, matching the information to be pushed with contents of the information receiving requirement form;

when a matching degree meets a demand of the receiver, pushing the to-be-pushed information to the receiver;

when the receiver has not inputted the second piece of information in the information receiving requirement form, pushing the to-be-pushed information to an address of the receiver;

wherein the to-be-pushed information comprises structured abstract information, non-structured abstract information, relevant detailed information in an information publishing and storage system and linkable webpage information offered in the abstract information;

wherein the receiver is capable of storing or displaying the to-be-pushed information and comprises internet communication terminals, web server and internet information storage servers;

wherein the retrieval template is provided with an input box of topic keyword for retrieval content, an option of pragmatic keyword for retrieval range limits, an input box of common keyword under the pragmatic keyword;

wherein the information retrieval condition comprises topic keyword acquired from the retrieval template, the pragmatic keyword selected by users, common keyword under the option of pragmatic keyword or a combined result; and wherein an operation of performing retrieval comprises:
outputting the retrieval template;
acquiring the information retrieval condition inputted or selected by users from the retrieval template;

acquiring a retrieval instruction, matching acquired information retrieval condition with internet information comprising the structured information, non-structured information, relevant detailed information stored in the universal internet information publishing system and the linkable detailed information out of the system, and outputting the retrieval result.

2. The method according to claim 1, wherein the information push template comprises a column for displaying the to-be-pushed information, a selection item for selecting an object toward which the pushing is pointed, a selection item for selecting push type and a button for the information push instruction; the object comprises relevant professional website, relevant publishing platforms, relevant organization website, information service for mobile location and manual calling.

3. The method according to claim 1, further comprising:
carrying on statistical analysis on common top-layer and sublayer abstract structure tab and classification integration result of arbitrary topic keyword of the internet information;

obtaining a result for the statistical analysis and automatically generating a structure tab of universal abstract database of the internet information including a link address of detailed information and a universal template of information publishing;

acquiring top layer and sublayer abstract structure tab applicable for the arbitrary topic keyword of the internal information added by users from the universal template of information publishing;

adjusting the universal abstract database of the internet information and the universal template structure tab of information publishing automatically according to use frequency of system users, and saving the structure tab added by users in the abstract structure tab used by the users independently;

acquiring an instruction of invoking information publishing template of the users and outputting the universal internet information publishing template pre-set with the common top layer and sublayer abstract structure tab of the arbitrary topic keyword;

acquiring the structured information abstract input by users and non-structured information abstract attached to "other" categories, items from the universal internet information publishing template, and acquiring the structured abstract publishing information and non-structured abstract publishing information which establish mapping relationship for structured information tab in other websites and abstract structure tab of the system;

acquiring the detailed information uploaded by users after the abstract information published from the universal internet information publishing template or automatically or manually add the abstract structure tab of the system to a thesaurus uploaded with detailed information or full text key words search of the web information of the outside system; and acquiring the instruction of information storing and saving the acquired abstract information in the storing database of universal abstract information, saving the acquired detailed information in the database for storing the detailed information by classification in the system.

4. The method according to claim 3, wherein an established mapping relationship between the structured information tab acquired from other websites and abstract structure tab of the universal internet information publishing system is defined as mapping relationship acquired from a template for setting mapping relationship of structured information tab; wherein the mapping relationship of structure tab includes both a top-layer structure tab and a lower-level structure tab, both one-to-one relationship and one-to-more relationship; the structured tab is shown in table format, or in the form of structure tab words with colon.

* * * * *